(12) United States Patent
Dasari et al.

(10) Patent No.: US 7,447,934 B2
(45) Date of Patent: Nov. 4, 2008

(54) SYSTEM AND METHOD FOR USING HOT PLUG CONFIGURATION FOR PCI ERROR RECOVERY

(75) Inventors: Shiva R. Dasari, Austin, TX (US);
Sudhir Dhawan, Austin, TX (US);
Ryuji Orita, Redmond, WA (US);
Wingcheung T. Tam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 11/168,145

(22) Filed: Jun. 27, 2005

(65) Prior Publication Data

US 2007/0011500 A1    Jan. 11, 2007

(51) Int. Cl.
*G06F 11/00* (2006.01)
(52) U.S. Cl. ......................................................... 714/5
(58) Field of Classification Search ................ 714/5, 714/8
See application file for complete search history.

(56) References Cited

U.S. PATENT DOCUMENTS

| | | | |
|---|---|---|---|
| 5,815,647 A * | 9/1998 | Buckland et al. ............... | 714/3 |
| 6,018,810 A * | 1/2000 | Olarig ........................... | 714/43 |
| 6,115,813 A | 9/2000 | Hobson et al. | |
| 6,338,107 B1 | 1/2002 | Neal et al. | |
| 6,678,775 B1 | 1/2004 | Zink | |
| 6,708,283 B1 * | 3/2004 | Nelvin et al. ................... | 714/5 |
| 6,766,469 B2 * | 7/2004 | Larson et al. ................... | 714/7 |
| 2002/0184576 A1 * | 12/2002 | Arndt et al. .................... | 714/48 |
| 2003/0023895 A1 * | 1/2003 | Sinha et al. .................... | 714/5 |
| 2003/0093604 A1 | 5/2003 | Lee | |
| 2006/0085671 A1 * | 4/2006 | Majni et al. .................... | 714/5 |
| 2006/0294149 A1 * | 12/2006 | Seshadri et al. ............. | 707/200 |

* cited by examiner

*Primary Examiner*—Joshua A Lohn
(74) *Attorney, Agent, or Firm*—Cynthia S. Byrd; Dillon & Yudell LLP

(57) ABSTRACT

A method, system, and program product for recovering from a bus error in a computer system having a hot plug interface. In accordance with the method of the present invention, an operating system transparent interrupt, such as a system management interrupt, is generated in response to a bus error. Responsive to the operating system transparent interrupt, the hot pluggable bus is scanned and a device associated with the error is identified by an interrupt handler invoked by the interrupt. Finally, a hot plug configuration manager, such as an advanced configuration and power interface is utilized to remove the identified device from system operations without having to restart the system.

2 Claims, 3 Drawing Sheets

SYSTEM AND METHOD FOR USING HOT PLUG CONFIGURATION FOR PCI ERROR RECOVERY

BACKGROUND OF THE INVENTION

1. Technical Field

The present invention relates generally to error handling in data processing systems, and in particular, to a system and method for recovering from an error occurring in association with a bus or interconnect that supports hot plugging.

2. Description of the Related Art

Computer systems generally comprise multiple devices interconnected by one or more buses or interconnects. For example, a typical computer system architecture includes a processor connected to main memory through a host or memory bus. The host or memory bus is connected to an expansion bus. In many computer architectures, the expansion bus is typically a local bus such as a peripheral component interconnect (PCI) bus. PCI generally designates a physical and logical interconnection between a host entity, such as a processor or bus bridge, and devices attached via so-called expansion slots designed for high-speed operation.

PCI bus architecture development has been instrumental to developments in overall system architecture. The PCI-X standard is one such development directed toward improving performance of high-bandwidth devices such as gigabit Ethernet cards, Fibre Channel, Ultra3 Small Computer System Interface (SCSI), processors interconnected as a cluster, etc.

A problem associated with bus architectures such as PCI relates to error handling. When an error is detected on the bus, such as in a PCI card slot, the address at which the failure occurred in logged. This is typically accomplished by error logging circuitry in the host bridge (or PCI to PCI bridge). When, for example, a PCI bus parity error (PERR) or system error (SERR) occurs on any PCI-X bus on a server system, the conventional error handling technique proceeds as follows. First, a system management interrupt (SMI) is generated in response to the PERR/SERR condition. An SMI handler is invoked and scans all PCI-X devices in the system to identify the problematic device. The SMI handler typically records the error in an error log maintained on a bus bridge or adapter device and asserts a user indicator such as an LED indicator corresponding to the identified device. Finally, the SMI handler requests a service processor to generate a non-maskable interrupt (NMI) that results in a system reboot procedure.

For many computer systems such as high-end servers, any unscheduled system shutdown is costly. Accordingly, there is a need for handling PCI bus errors that enables the system to continue reliable operations in a manner that avoids rebooting the system.

SUMMARY OF THE INVENTION

A method, system, and program product for recovering from a bus error in a computer system having a hot plug interface are disclosed herein. In accordance with the method of the present invention, an operating system transparent interrupt, such as a system management interrupt, is generated in response to a bus error. Responsive to the operating system transparent interrupt, the hot pluggable bus is scanned and a device associated with the error is identified by an interrupt handler invoked by the interrupt. Finally, a hot plug configuration manager, such as an advanced configuration and power interface is utilized to remove the identified device from system operations without having to restart the system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention is generally directed to a system, method and computer program product for handling bus errors. In particular the invention is directed to handling such errors resulting from failures in devices coupled to a bus or interconnect having hot plug configuration capabilities such as a peripheral component interconnect (PCI) bus. In a preferred embodiment, the invention is directed to handling "hard" bus transaction errors such as data and/or address parity errors that, for example, are reported using the PERR and SERR convention of the PCI specification. As explained in further detail with reference to the figures, the present invention provides a means for enabling the system to recover from PCI input/output (I/O) errors and other bus transaction errors, such as PCI bus parity errors (PERRs) or system errors (SERRs), by combining hot plug configurability with bus error detection and notification means. By incorporating hot plug configurability features into bus error processing, faulty devices may be taken offline without the need to shutdown and reboot the system. In a preferred embodiment, the present invention leverages advanced configuration and power interface (ACPI) hot plug capabilities, such as those used in PCI-X bus architectures, together with PCI error detection functionality to provide an error recovery mechanism that enables a faulty bus device to be taken offline without having to reboot the system. Further information relating to the PCI and PCI-X specification may be found in the PCI-X specification, rev. 2.0, the content of which is incorporated by reference herein in its entirety.

Figure 1:
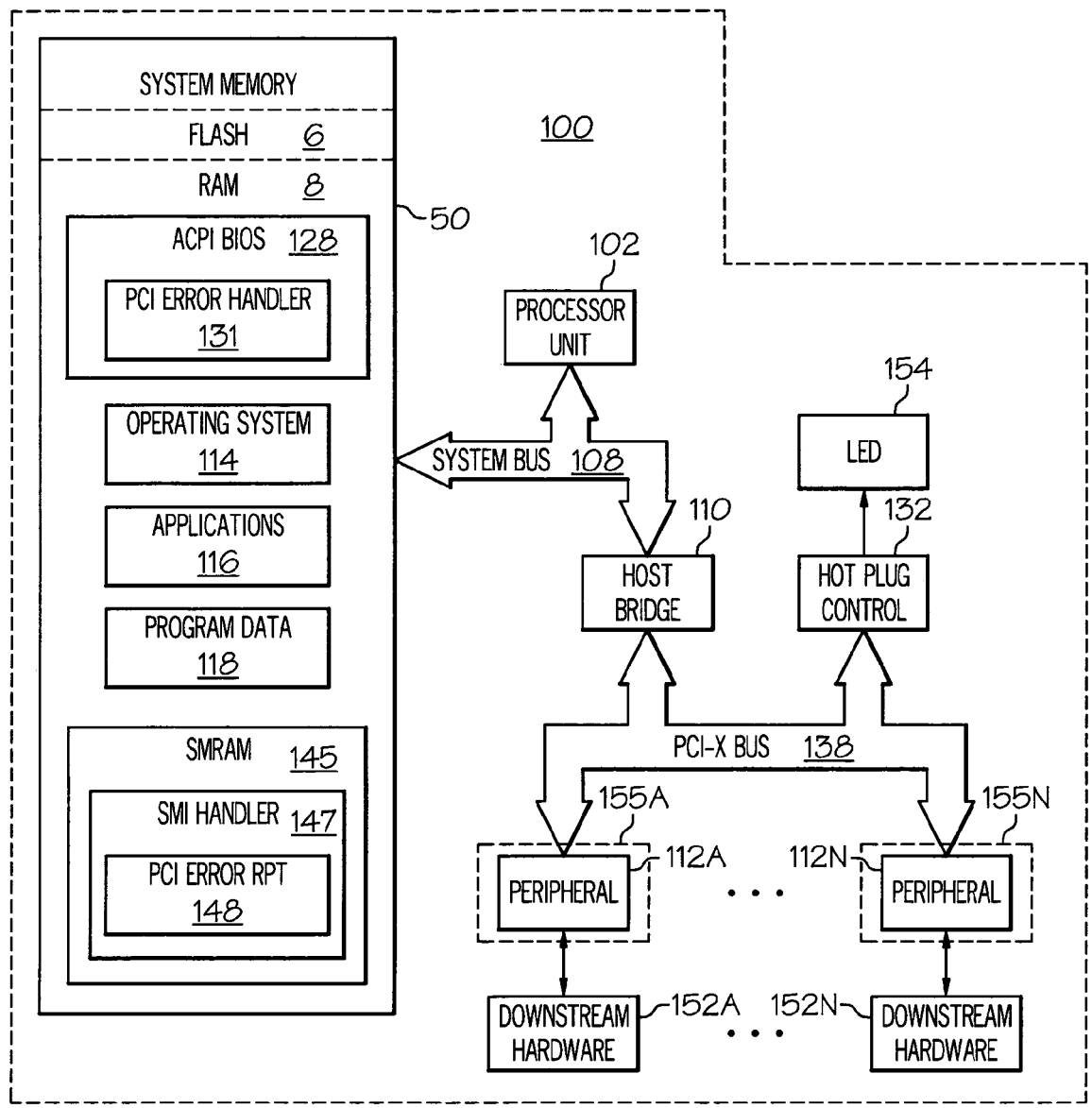
FIG. 1 is a high-level block diagram of a data processing system adapted to implement PCI bus error recovery in accordance with the present invention.

With reference now to the figures, wherein like reference numerals refer to like and corresponding parts throughout, and in particular with reference to FIG. 1, there is depicted a data processing system 100 adapted for implementing bus error recovery in accordance with the present invention. Data processing system 100 is described herein as a symmetric multiprocessor (SMP) system, although, as used herein, the terms "data processing system," "computer," and the like are intended to mean essentially any type of computing device or machine that is capable of receiving, storing and running a software product, including such devices as communication devices (e.g., pagers, telephones, electronic books, etc.) and personal and home consumer devices (e.g., handheld computers, Web-enabled televisions, home automation systems, multimedia viewing systems, etc.).

FIG. 1 and the following discussion are intended to provide a general description of an exemplary data processing system adapted to implement the present invention. While the invention will be described in the general context of specifically labeled electronic and program modules running within a multiprocessor type computer, those skilled in the art will recognize that the invention also may be implemented in combination with other program modules to achieve the same results. Generally, program modules include routines, programs, components, data structures, etc. that perform particular tasks or implement particular abstract data types. Moreover, those skilled in the art will appreciate that the invention may be practiced with other computer system configurations employing single or multiprocessor designs, including handheld devices, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As depicted in FIG. 1, data processing system 100 includes one or more processor(s) 102 communicatively coupled to a system bus 108. Processor 102 represents one or more central processing units of any type of architecture, such as CISC (Complex Instruction Set Computing), RISC (Reduced Instruction Set Computing), VLIW (Very Long Instruction Word), or a hybrid architecture, although any appropriate processor may be used. Processor 102 executes instructions and controls overall system operation. In support of its control function, processor 102 reads and/or stores code and data to/from a main system memory 50. Although not depicted in FIG. 1, processor 102 may include a variety of other elements not necessary to understanding the present invention.

System memory 50 is accessible to processor 102 via system bus 108. System memory 50 is typically implemented as a combination of non-volatile storage media such as read-only memory (ROM) devices and volatile storage media such as an array of dynamic random access memory (DRAM) devices.

As further depicted in FIG. 1, a host bridge 110 provides an interface between system bus 108 and an I/O bus 138 to which one or more peripheral devices 112A-112N are connected. I/O bus 138 is typically compliant with one of several industry standard I/O bus specifications including, for example, the Peripheral Components Interface (PCI) standard. Peripheral devices 112A-112N preferably comprise any type of peripheral device, such as network interface cards (NICs), graphics controllers, video accelerators, audio cards, hard or floppy disk controllers, Personal Computer Memory Card International Association (PCMCIA) controllers, Small Computer Systems Interface (SCSI) adapters, telephony cards, and others. Coupled to one or more of peripheral devices 112A-112N are additional downstream devices 152A-152N, which may be PCI-to-PCI adapters or other devices for otherwise expanding the functionality of I/O bus 138.

While only a single I/O bus 138 is depicted in FIG. 1, systems such as data processing system 100 generally include multiple PCI buses, wherein each bus includes multiple devices and possibly connected to other buses via bridges.

In accordance with the invention, I/O bus 138 conforms to a standard/specification supporting hot plug capability. To implement this capability, data processing system 100 preferably includes a hot plug controller 132. Hot plug controller 132 is communicatively coupled to the various I/O bus peripherals 112A-112N via signals carried over I/O bus 138 and other signal lines (not depicted). Such signals to and from hot plug controller 132 are used to electrically and logically isolate a corresponding device 112 from I/O bus 138 when removing a device (e.g. PCI adapter card) and/or when taking the device offline in accordance with the bus error recovery technique of the present invention. Hot plug controller 132 preferably is capable of generating parity and system error signals PERR and SERR when an error condition is detected for one of the devices 112A-112N. Such error signals may be reported by hot plug controller 132 directly to processor 102 or, alternatively, may be provided to other logic, such as host bridge 110 or other logic not shown, and such other logic may generate a SMI. In any case, when the hot plug controller 132 asserts a bus transaction error signal, such as a PERR or SERR signal, an SMI (or other suitable interrupt) is asserted. As is known to those skilled in the art, a SERR signal indicates a severe system error in data processing system 100 relating to the addressing phase and PERR indicates a parity error during the data phase of PCI bus I/O.

Host bridge 110 facilitates communication between I/O bus 138 and system bus 108. Bus switch control logic within hot plug controller 132 is coupled to host bridge 110 and I/O bus 138, and provides control over the I/O bus 138 for increased loading thereof. More specifically, and assuming I/O bus 138 conforms to the PCI hot plug specification of the PCI standard, switch control logic within hot plug controller 132 provides control over I/O bus 138 for insertion and removal of peripheral devices 112 such as PCI adapter cards while allowing the system and the rest of the PCI I/O subsystem to remain powered and operational. In this manner, the load capabilities of I/O bus 138 are expanded, and insertion and removal of PCI adapter cards is possible while allowing the system and the rest of the PCI I/O subsystem to remain powered and operational, via the use of in-line switch modules (not shown) in combination with the bus switch control logic within hot plug controller 132.

Assuming peripheral devices 112A-112N are PCI adapter cards, each of devices 112A-112N is installed into corresponding adapter slots 155A-155N. While not expressly depicted in FIG. 1, each of adapter slots 155A-155N includes a connector that mates with a corresponding connector on the PCI adapter card, thus providing an electrical and mechanical coupling interface between the adapter card and data processing system 100. Furthermore, each of adapter slots 155A-155N preferably includes a mechanical or electromechanical member (not depicted) that can be mechanically actuated by a user. The mechanical members may comprise, for example, levers that can be flipped from one position to another and back. When actuated, such a mechanical member causes a signal (not depicted) to be asserted to a hot plug controller 132 to alert the controller that removal of the PCI adapter from the slot in which the mechanical member was actuated is underway. Among its other functions relating to configuration of peripherals 112A-112N, hot plug controller 132 causes the power to be applied or removed from a given one of slots 155A-155N depending on the configuration status of the corresponding devices as determined by configuration settings within ACPI BIOS 128.

Peripheral devices 112A-112N, such as adapter cards, use designated error signals such as a PERR or SERR signal to report a parity or system error relating to PCI I/O. To avoid system operations using invalid or corrupted data, convention PCI error processing generally includes halting and resetting (i.e. rebooting) in most cases. This can be the reason for a system crash or sudden shutdown which can be costly in terms of time and money in the case of a high-end server application.

As further depicted in FIG. 1, system memory 50 includes persistent storage flash memory 6 and volatile random access memory (RAM) 8. A number of program modules may be stored in system drives (not depicted) and RAM 8, including an operating system 114, application program modules 116, and program data 118. Flash memory 6 comprises electrically erasable programmable read only memory (EEPROM) modules for persistently storing such as system startup programs. Copied from Flash memory 6 to RAM 8 during system startup, is a basic input/output system (BIOS) 128, containing the basic routines and instructions for transferring information between elements within data processing system 100, such as during start-up. In the depicted embodiment, BIOS 128 is an ACPI BIOS that includes instructions and modules for interacting with operating system 114 and hot plug controller 132 to implement hot plug as well as power management functionality within data processing system 100.

ACPI is generally a power management specification that enables the operating system to turn off selected devices, such as a monitor or CD-ROM drive when not in use for a specified period. In addition to providing power management, ACPI also provides hot plug configuration support.

The Advanced Configuration and Power Interface (ACPI) specification was developed to establish industry common interfaces enabling robust operating system (OS)-directed motherboard device configuration and power management of both devices and entire systems. ACPI is the key element in Operating System directed configuration and Power Management (OSPM). ACPI evolves the existing collection of power management BIOS code, Advanced Power Management (APM) application programming interfaces (APIs, PNP-BIOS APIs, Multiprocessor Specification (MPS) tables and so on into a well-defined power management and configuration interface specification. ACPI provides the means for an orderly transition from existing (legacy) hardware to ACPI hardware, and it allows for both ACPI and legacy mechanisms to exist in a single machine and to be used as needed. Further, new system architectures are being built that stretch the limits of current Plug and Play interfaces. ACPI evolves the existing motherboard configuration interfaces to support these advanced architectures in a more robust, and potentially more efficient manner.

Systems, such as data processing system 100 that support hot plug PCI utilize ACPI to inform the operating system of insertion and removal events. In convention systems, ACPI discovers hardware insertion and removal events when a so-called general purpose event is asserted and a system control interrupt (SCI) is raised. For example, when a user requests to remove a hot pluggable device, the following steps are performed. First, the user may actuate an eject button for the PCI slot. The hot plug PCI controller responds by asserting a general purpose event. In response to the general purpose event, the core chip set raises an SCI.

Known power management and configuration techniques, such as the advanced power management (APM) and the plug-and-play specifications, were implemented by basic input-output system (BIOS) instructions stored in read-only memory. When a power management or configuration event occurred (e.g., a request to transition from an "on" state to a "sleep" state), the BIOS received notice of the event via an operating system transparent interrupt known as a system management interrupt (SMI). It was the responsibility of the BIOS to manipulate the necessary software state information and to control the system's hardware and perform the requested action.

Under the new ACPI, when a power management or configuration event occurs the operating system is notified via an operating system visible interrupt known as a system control interrupt (SCI). It is the operating system itself that directs all system and device power state transitions. Central to ACPI operations is an ACPI driver. This driver is an operating system level program which receives notice of all SCI events and either performs the necessary event handling actions itself, or passes control to an ACPI control method.

The ACPI specification represents an abstract interface between a computer system's hardware and firmware and its operating system. The ACPI includes hardware registers, tables, and as well as ACPI BIOS 128. ACPI registers are used to store and pass event information between the hardware/firmware and operating system. ACPI tables are used to describe system information (e.g., supported power states, power sources, clock sources), features (e.g., available hardware devices), and methods for controlling those features (e.g., ACPI control methods). ACPI BIOS is that part of the computer system firmware that implements the ACPI specified interfaces for sleep, wake, some restart operations, and provides permanent storage of ACPI table information. Further information relating to ACPI may be found in the Advanced Configuration and Power Interface specification, rev. 3.0, the content of which is incorporated herein in its entirety.

The present invention combines hot plug functions, such as those deployed by ACPI BIOS 128, with bus error detection and reporting functions implemented by buses and bus devices to provide a combined detection, reporting, and system recovery mechanism. As further depicted in FIG. 1, a system management interrupt (SMI) handler module 147 is stored within a protected and specially designated system management RAM (SMRAM) address space 145 of RAM 8. SMRAM 145 is logically independent from the rest of system memory 50 in that it is only accessible while the system operates in system management mode (SMM) in which one or more processors have received a system management interrupt. SMRAM 145 generally contains SMI handler routines such as those used by SMI handler module 147, and, when processor 102 has entered SMM in response to an SMI request (hardware interrupt transparent to the operating system), the processor saves or dumps its operating state into the protected address space provided by SMRAM 145. SMI interrupt handler 147 includes many of the conventional routines and instructions for processing various types of system management interrupts in accordance with well known SMM operation principles. Furthermore, and in accordance with the depicted embodiment, SMI handler 147 includes a PCI error reporting module 148 that is invoked responsive to an SMI indicating a PCI bus error.

As explained in further detail below with reference to FIGS. 2 and 3, the error handling method of the present invention combines the error detection and notification functions performed by PCI error reporting module 148 with the error handling routines and instructions performed by a PCI error handler 131 deployed from ACPI BIOS 128.

As explained in further detail below, PCI error reporting module 148 includes routines and instructions, for, in response to an SMI resulting from a PCI error, scanning the bus-connected devices in the system to identify the problematic device. The error processing of PCI error reporting routine 148 further includes instructions for recording the error in an error log in the PCI device in question. Furthermore, a user indicator is preferably asserted, such as illuminating an alert LED 154 corresponding to the faulty device.

In accordance with the invention, the standard employed by I/O bus 130 provide for "hot plug" capability. As utilized herein, "hot plug" generally refers to being able to install or remove an expansion card from a computer while the computer is operating. The hot plug capability implemented in part by hot plug controller 132, permits, for example, a PCI card, such as one of peripheral devices 112A-112N, to be functionally added to or removed from their respective slots 155A-155N on PCI bus 138 while the remaining bus and data processing components continue to operate.

When a hot-plug "hot-add" operation occurs, any component added to the operating platform also typically requires some attention with regard to initialization. However, since the platform BIOS is not in control of the platform during the hot-plug operation, device-specific code, provided by the BIOS, is typically executed by the OS to effect hot-plug initialization. For example, such an operational mechanism may be implemented using the Advanced Configuration and Power Interface (ACPI) Source Language (ASL), as defined in the ACPI Specification. Further information regarding ACPI and ASL may be obtained by referring to the ACPI Specification, Revision 2.0a, Mar. 31, 2002, the content of which is incorporated herein by reference.

The hot plug capability of I/O bus 138 enables a user to simply remove and install PCI cards without having to shut down and reboot the data processing system 100. In accordance with conventional PCI bus hot plug specification operating procedures, the user must alert the data processing system's software before removing a PCI card. This process generally entails the user notifying a hot plug service routine of the user's desire to remove a card from a particular slot. The service routine then uses various operating system functions to "quiesce" the software driver associated with the PCI card the user desires to remove. Quiescing means that all communications between the PCI card to be removed and the rest of the computer system are discontinued. In addition to directing the system not to initiate any new transactions to the PCI card to be removed, a reset signal is also asserted to the PCI device to prevent it from attempting to communicate with the rest of the system. The hot plug service routine invoked such as from ACPI BIOS 128 then causes power to the slot to be turned off. At this point, the user can remove the PCI device.

These steps are generally reversed to add a card to a hot plug PCI bus. The user first installs the card in a vacant PCI slot and then notifies the hot plug service routine that a new card is present and should be turned on. The system responds by powering on the slot and permitting communications to occur to or from the newly installed PCI card.

Figure 2:
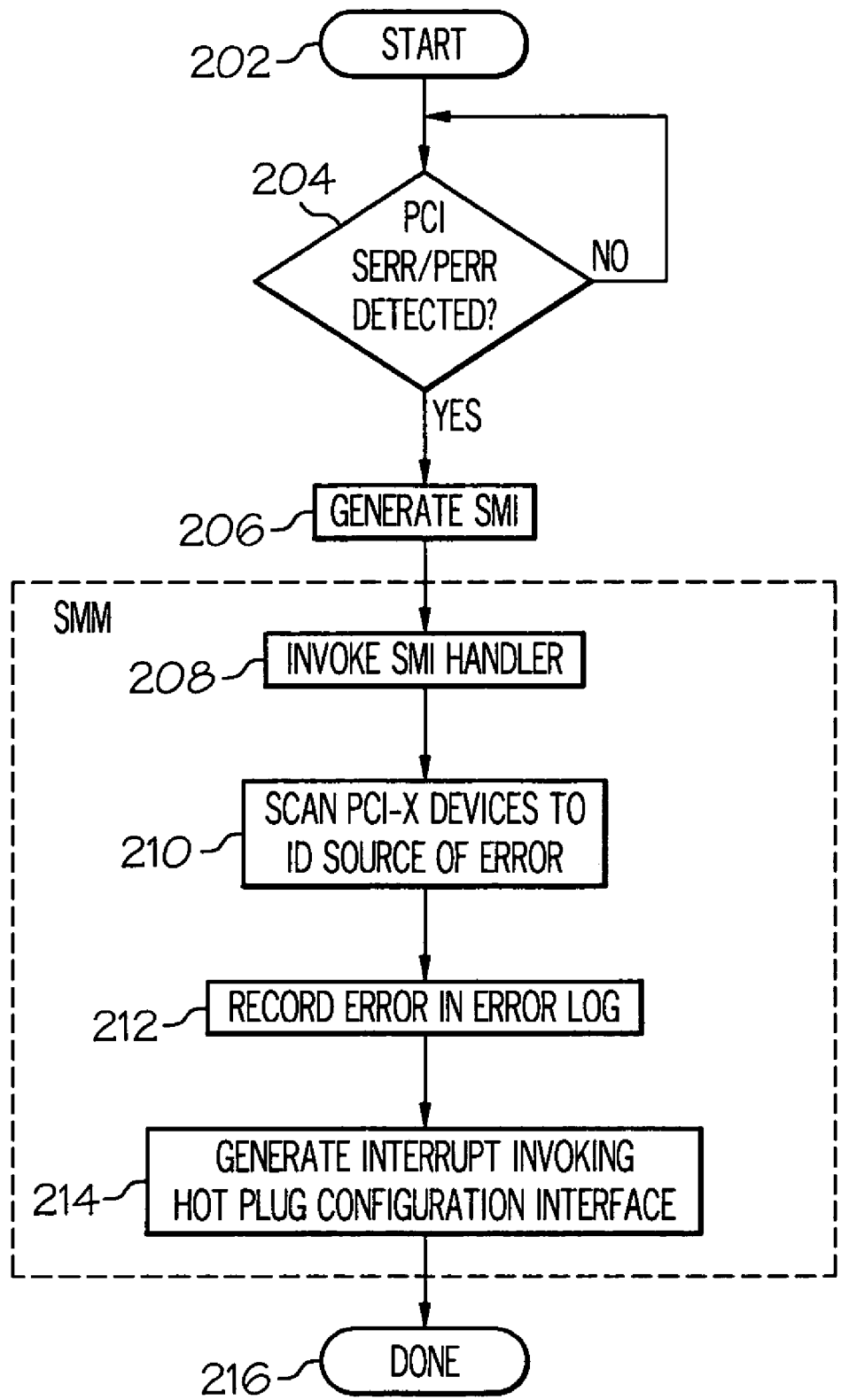
FIG. 2 is a high-level flow diagram illustrating steps performed during detection, notification, and recording of PCI bus errors in accordance with one embodiment of the present invention.
Figure 3:
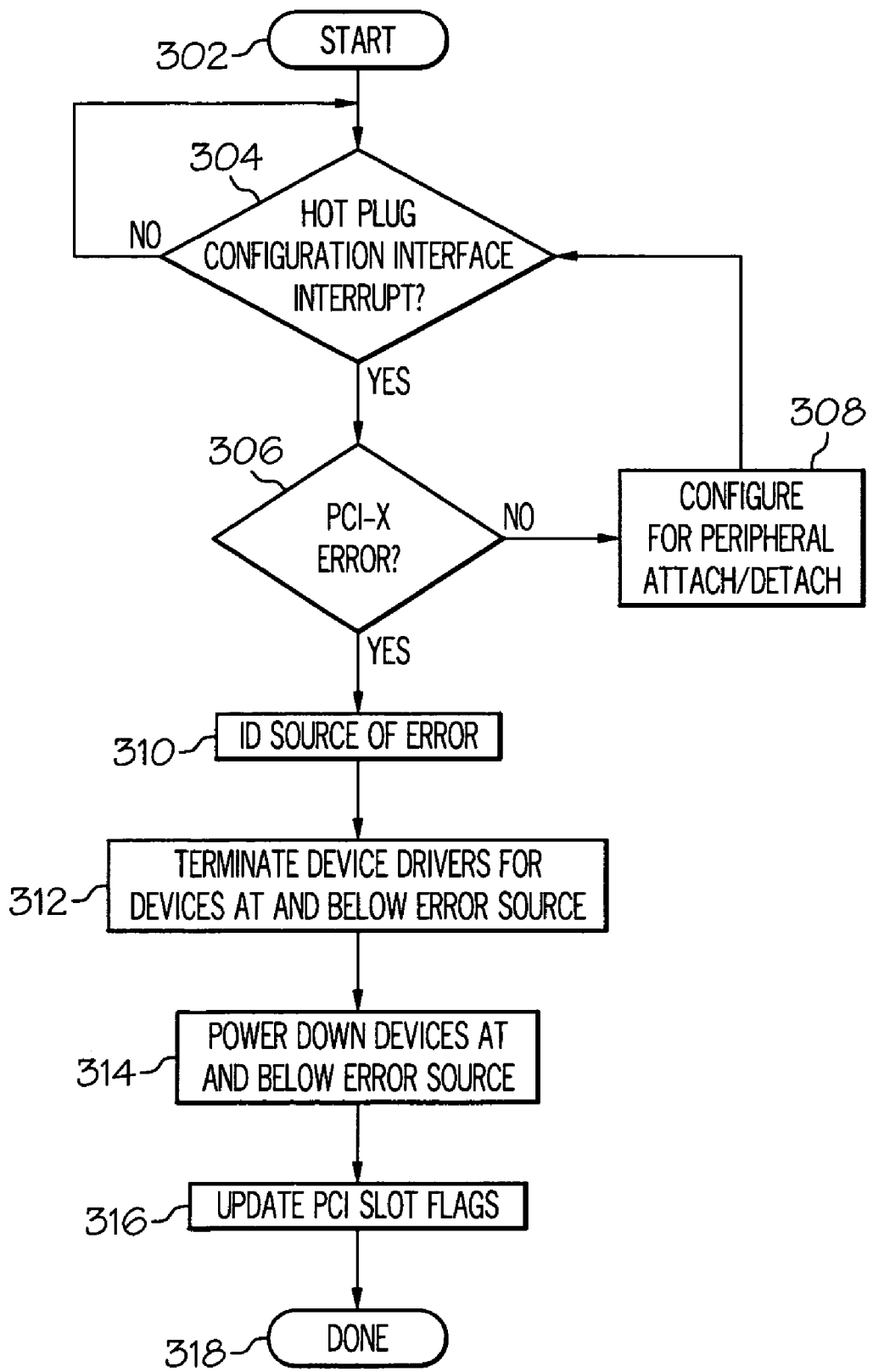
FIG. 3 is a high-level flow diagram depicting steps performed by a hot plug configuration interface in response to a PCI bus error in accordance with a preferred embodiment of the invention.

As explained now with reference to FIGS. 2 and 3, the method of the present invention enables a failing PCI device to be identified and deactivated in a manner that preserves current processor state data, is transparent to the operating system, and imposes minimal if any overall runtime processing disruption.

Referring first to FIG. 2, there is depicted a high-level flow diagram illustrating steps performed during detection, notification, and recording of PCI bus errors such as may be performed by data processing system 100 in accordance with one embodiment of the present invention. The process begins as illustrated at steps 202 and 204 with bus operations conducted over I/O bus 138 until a bus error is detected. In an embodiment in which I/O bus 138 conforms to the PCI-X specification, the error detected at step 204 may be a SERR or PERR error detected within one of peripheral devices 112A-112N and reported to operating system 114.

In response to the detected bus error, a system management interrupt (SMI) is generated in PCI bus hardware such as by host bridge 110 and sent to processor unit 102 as shown at step 206. The generated SMI is recognized and processor 102 saves its present operating state in a state save map (not depicted), initializes various registers to support a system management mode (SMM) execution environment, and commences execution with SSM as depicted in FIG. 2. In a conventional ACPI power management implementation, a one of peripheral devices 112A-112N, typically a keyboard controller, generates SMIs to notify ACPI BIOS 128 of "power management" system events. These events include hot keys, thermal conditions, battery status, and specified button presses. These operations are performed without operating system knowledge or interference and as such are referred to herein as "operating system transparent."

An SMI handler, such as SMI handler 147, is invoked to process the event. In accordance with the depicted embodiment, the event is a PCI bus error. As shown at steps 210 and 212 processing of the event by SMI handler 147 includes scanning peripheral devices 112A-112N to identify the source of the error detected at step 204. In one embodiment, the scanning performed as shown at step 210 may comprise searching one or more error condition registers located in any or all of host bridge 110 and peripheral devices 112A-112N to identify which device the device originated from, possibly from one of the downstream devices 152A-152N. Once located in association with a specified one of devices 112A-112N, the error is recorded by SMI handler 147 in an error log. While not expressly depicted in FIG. 2, the bus error processing performed by SMI handler may further include asserting a user-indicator, such as an LED indicator to identify which of devices 112A-112N is the "problem" device.

Next, and in accordance with a preferred embodiment of the invention, SMI handler 147 generates an interrupt for invoking a hot plug configuration interface (step 214). In a preferred embodiment, the hot plug configuration interface comprises, at least in part, ACPI BIOS 128, and, more specifically, a PCI error handler module 131 within ACPI BIOS 128. In a preferred embodiment, the interrupt generated at step 214 is a system control interrupt (SCI) that prompts PCI error handler 131 to address a specified bus device error. Processing of the system control interrupt in accordance with the invention is described below with reference to FIG. 3. The SMM execution terminates when processor 102 encounters a restore state map or similar instruction and restores the saved processor state information and resume operation system operations. The process for detecting a bus error ends as shown at step 216.

With reference to FIG. 3, there is illustrated a high-level flow diagram depicting steps performed by a hot plug configuration interface in response to a PCI bus error in accordance with a preferred embodiment of the invention. As shown in FIG. 3, the process begins at step 302 and proceeds to step 304 with a determination of whether or not a hot plug configuration interface interrupt has occurred. As utilized herein a hot plug configuration interface interrupt corresponds to a system configuration interrupt, such as that generated as shown at step 214, specifying a bus device error. As shown at steps 306 and 308, if the event specified by the system configuration interrupt is not a device error occurring on or in association with a hot pluggable bus (i.e. non-error hot plug event in which a device is installed or removed from the bus), ACPI BIOS 128 handles the system configuration interrupt by configuring the operating state of the system accordingly.

If, as depicted at steps 306 and 310, the event specified by the system configuration specifies a bus device error, PCI error handler 131 identifies the problematic device using error registers or otherwise. Given that the system is no longer operating in SMM which is operating system transparent, and as shown at step 312, PCI error handler 131 requests operating system 114 to terminate all device driver(s) of the device(s) on the PCI bus (I/O bus 138 or other) on which the identified problem device is coupled. Proceeding as shown at step 314, PCI error handler 131 further issues a request to hot plug controller 132 to power down the device(s) corresponding to those identified at step 310. Having terminated the device drivers and removed operating power from the suspect devices, the bus error handling system/method of the invention has effectively removed the problematic device from system operations without having to restart or "reboot" the system. Furthermore, and in a preferred embodiment, the status flags (not depicted) for one or more of adapter slots 155A-155N corresponding to the de-allocated device(s) are changed to reflect a non-hotpluggable status (step 316) to prevent the slots from restarting prior to checking and resetting by the system administrator. The bus error recovery ends as shown at step 318.

While the invention has been particularly shown and described with reference to a preferred embodiment, it will be understood by those skilled in the art that various changes in form and detail may be made therein without departing from the spirit and scope of the invention.

What is claimed is:

1. In a computer system having a hot plug interface, a method for recovering from a bus error comprising:
   detecting a bus error on an input/output I/O bus of the computer system;
   automatically generating an operating system transparent interrupt, responsive to the bus error;
   wherein the operating system transparent interrupt is a system management interrupt (SMI) that invokes an SMI handler and is generated in peripheral component interconnect (PCI) bus hardware and transmitted to a processor of the computer system;
   responsive to the operating system transparent interrupt:
      saving a present operating state of the processor:
      initiating one or more registers to support a system management mode (SMM);
      commencing execution with SMM; and
      invoking an interrupt handler that scans devices on the bus to identify the device associated with the error;
   wherein the SMI handler generates a system control interrupt (SCI);
   identifying a device associated with the bus error by scanning peripheral devices and searching one or more error condition registers;
   determining whether the SCI specifies an error on a hot pluggable bus;
   recording the error in an error log;
   asserting a user-indicator to indentify which device caused the bus error; and
   responsive to the system control interrupt specifying an error on a hot pluggable bus, invoking a hot plug configuration manager to remove the device in accordance with a hot plug configuration process;
   wherein the hot plug configuration manager comprises an advanced configuration and power interface (ACPI);
   dynamically removing the identified device from system operations utilizing the hot plug configuration manager to perform the removal; and
   restoring saved processor state information and resuming operation system operations.

2. In a computer system having a hot plug interface, a system for recovering from a bus error comprising:
   a bus device that generates an operating system transparent interrupt responsive to the bus error;
   an interrupt handler, responsive to the operating system transparent interrupt, for identifying a device associated with the bus error; and
   a hot plug configuration manager that removes the identified device from system operations;
   wherein the hot plug configuration manager comprises an advanced configuration and power interface (ACPI)
   wherein said hot plug configuration manager removes the device in accordance with a hot plug configuration process;
   wherein the operating system transparent interrupt is a system management interrupt (SMI) that invokes an SMI handler and is generated in peripheral component interconnect (PCI) bus hardware and transmitted to a processor of the computer system;
   a processor, which, responsive to the operating system transparent interrupt performs the functions of:
      saving a present operating state of the processor;
      initiating one or more registers to support a system management mode (SMM); and
      commencing execution with SSM;
   wherein the SMI handler generates a system control interrupt (SCI), said SCI invoking the hot plug configuration manager; and
   a bus error handler for;
      determining whether the SCI specifies an error on a hot pluggable bus; and
      responsive to the system control interrupt specifying an error on a hot pluggable bus, invoking the hot plug configuration manager to perform the removal.

* * * * *